United States Patent
Barrett et al.

(10) Patent No.: US 11,379,465 B2
(45) Date of Patent: Jul. 5, 2022

(54) AUTONOMOUS SELF-HEALING APPLICATION DATA VALIDATION USING DATABASE CONFIGURATIONS

(71) Applicant: Raytheon Company, Waltham, MA (US)

(72) Inventors: Nicholas W. Barrett, Oro Valley, AZ (US); Kevin Carrasco, Tolleson, AZ (US); Jackye C. Wesley, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 259 days.

(21) Appl. No.: 16/738,283

(22) Filed: Jan. 9, 2020

(65) Prior Publication Data

US 2021/0216526 A1 Jul. 15, 2021

(51) Int. Cl.
*G06F 16/23* (2019.01)
*G06F 8/41* (2018.01)

(52) U.S. Cl.
CPC ............ *G06F 16/2365* (2019.01); *G06F 8/41* (2013.01)

(58) Field of Classification Search
CPC . G06F 16/23; G06F 16/2365; G06F 16/24564
USPC ........................................................ 707/690
See application file for complete search history.

(56) References Cited

U.S. PATENT DOCUMENTS

| 7,913,159 B2 | 3/2011 | Larcheveque et al. |
| 8,739,118 B2 | 5/2014 | Meek et al. |
| 9,535,935 B2 | 1/2017 | Dorns |
| 10,795,907 B2 * | 10/2020 | Seah ....................... G06F 16/26 |
| 2011/0082569 A1 * | 4/2011 | Bellville ................. G06F 16/22 700/79 |
| 2011/0270857 A1 * | 11/2011 | Bommireddipalli .... G06F 21/62 707/758 |
| 2013/0018850 A1 * | 1/2013 | Houlihan ........... G06Q 30/0611 707/690 |
| 2015/0193418 A1 * | 7/2015 | Koska ................ G05B 19/0423 715/223 |
| 2015/0193557 A1 * | 7/2015 | Okuno .................... G06F 30/00 703/1 |
| 2016/0299771 A1 * | 10/2016 | Navarro ............. G06F 9/44505 |

(Continued)

FOREIGN PATENT DOCUMENTS

WO 2016/083912 A1 6/2016

OTHER PUBLICATIONS

Baeldung.com, "Dynamic DTO Validation Config Retrieved from the Database," Blog post, Nov. 2018, 12 pages.

(Continued)

*Primary Examiner* — James Trujillo
*Assistant Examiner* — Fariborz Khoshnoodi

(57) ABSTRACT

A method includes obtaining information associated with a database model, where the information includes configuration parameters of a database defined by the database model. The method also includes obtaining information defining data objects associated with an application, where the data objects are to be used by the application to access the database. The method further includes identifying one or more discrepancies between at least one of the data objects and the configuration parameters of the database. In addition, the method includes modifying the at least one data object to conform the application to a current configuration of the database.

21 Claims, 6 Drawing Sheets

(56) References Cited

U.S. PATENT DOCUMENTS

2017/0174226 A1\* 6/2017 Zhang ............... B60W 50/0098
2019/0068458 A1\* 2/2019 Stefanov ............. G06F 9/5077
2020/0004598 A1\* 1/2020 Brebner ............... H04L 67/141

OTHER PUBLICATIONS

Eclipse Foundation, "Dali Java Persistence Tools," User Guide, Release 3.2, Sep. 2012, 156 pages.
Gupta, "Spring Bean Validation—JSR-303 Annotations," HowToDoInJava Interview Questions, 2016, 15 pages.
Oracle, "The Java EE 6 Tutorial," 2013, 5 pages.
Bean Validation Expert Group, "JSR 303: Bean Validation," Version 1.0 Final, Red Hat, Inc., Oct. 2009, 143 pages.
Morling, "Bean Validation specification," Version 2.0.0.Final, Aug. 2017, 388 pages.
Ominiyi, "Bean Validation Made Simple With JSR 303," DZone Java, Dec. 2011, 5 pages.
Shillan, "Dynamic Creation of Validation Controls," Microsoft, Oct. 2004, 27 pages.
Weber, "Dynamic Database-Driven Validation Ranges in ASP.NET. MVC," DMC, Inc., May 2014, 5 pages.

\* cited by examiner

AUTONOMOUS SELF-HEALING APPLICATION DATA VALIDATION USING DATABASE CONFIGURATIONS

TECHNICAL FIELD

This disclosure is generally directed to computing and database systems. More specifically, this disclosure is directed to autonomous self-healing application data validation using database configurations.

BACKGROUND

Numerous data-processing applications and other computing applications rely on databases to store information used, generated, or collected by the applications. In some cases, the configuration of a database is defined using various rules, which may include field definitions, constraints, and other configuration parameters of the database. Field definitions typically define various data fields that can be used to store information and the types of information to be stored, and constraints typically define limits placed on those data fields.

SUMMARY

This disclosure relates to autonomous self-healing application data validation using database configurations.

In a first embodiment, a method includes obtaining information associated with a database model, where the information includes configuration parameters of a database defined by the database model. The method also includes obtaining information defining data objects associated with an application, where the data objects are to be used by the application to access the database. The method further includes identifying one or more discrepancies between at least one of the data objects and the configuration parameters of the database. In addition, the method includes modifying the at least one data object to conform the application to a current configuration of the database.

In a second embodiment, an apparatus includes at least one memory and at least one processor. The at least one memory is configured to store information associated with a database model, where the information includes configuration parameters of a database defined by the database model. The at least one memory is also configured to store information defining data objects associated with an application, where the data objects are to be used by the application to access the database. The at least one processor is configured to identify one or more discrepancies between at least one of the data objects and the configuration parameters of the database. The at least one processor is also configured to modify the at least one data object to conform the application to a current configuration of the database.

In a third embodiment, a non-transitory computer readable medium contains instructions that when executed cause at least one processor to obtain information associated with a database model, where the information includes configuration parameters of a database defined by the database model. The medium also contains instructions that when executed cause the at least one processor to obtain information defining data objects associated with an application, where the data objects are to be used by the application to access the database. The medium further contains instructions that when executed cause the at least one processor to identify one or more discrepancies between at least one of the data objects and the configuration parameters of the database. In addition, the medium also contains instructions that when executed cause the at least one processor to modify the at least one data object to conform the application to a current configuration of the database.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
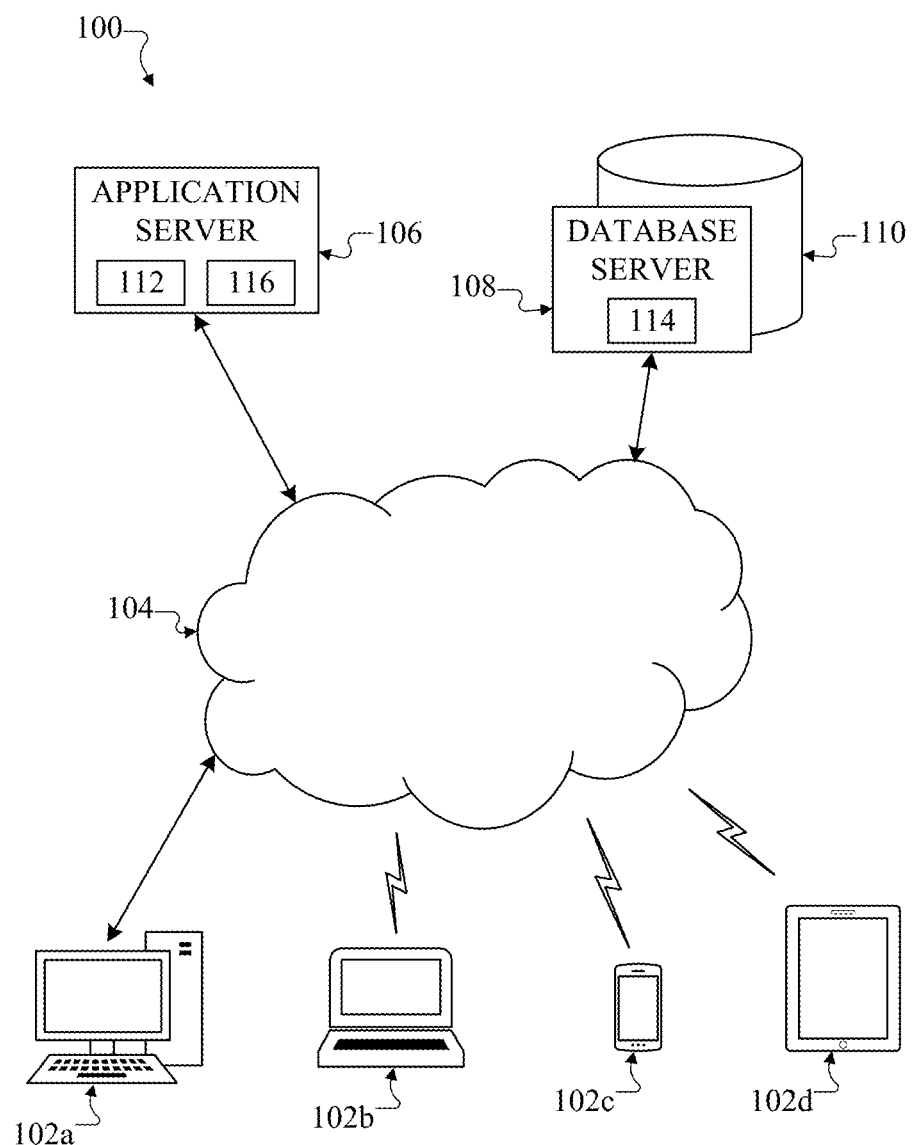
FIG. 1 illustrates an example system supporting autonomous self-healing application data validation using database configurations according to this disclosure.

FIGS. 1 through 7, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, various data processing applications and other computing applications routinely rely on databases to store information used, generated, or collected by the applications. In some cases, the configuration of a database is defined using rules, which may include field definitions, constraints, and other configuration parameters of the database. Field definitions typically define various data fields that can be used to store information and the types of information to be stored, and constraints typically define limits placed on those data fields. As a particular example, field definitions may be used to define different parts of mailing addresses, such as street address, city, state/province (if any), postal code, and country. Also, as particular examples, a constraint may be used to limit the length of a data field, to control whether a data field may be empty, or to require that a data field contain a value in an associated database table. The field definitions, constraints, and other configuration parameters of the database may be referred to collectively as a database model. A database model may provide all of the information needed to instantiate or create a specific database in a given database software package for use in a system.

Unfortunately, it is not uncommon for changes to be made to database configurations and application code independently. For example, database configurations may be created and managed by one or more individuals or teams of personnel, and application code for one or more applications may be created and managed by one or more other individuals or teams of personnel. If changes to a database configuration are made and corresponding changes to the application code are not made (or vice versa), errors can occur during execution of the application code. Avoiding this often requires strict adherence to time-consuming documentation and review processes.

As a particular example of the types of difficulties that can arise from these issues, application developers who work with relational database management systems (RDBMS) often deal with inconsistencies and issues by maintaining constraints on data lengths, data types, and other parameters in a database as well as in an application tier. This is often performed by different teams of personnel, and maintaining consistent data validation rules in multiple separated tiers of a software system can be difficult. As a result, inconsistencies in data validation rules can arise and cause problems for quality testing analysts or other personnel, and it can be difficult and time-consuming for developers and database administrators to keep various rules synchronized in the separated tiers.

This disclosure provides various techniques for application data validation using database configurations, which support autonomous self-healing of applications.

As described in more detail below, information associated with a database model is obtained from a database or other suitable source. The database model may, for example, represent or be based on field definitions, constraints, and other configuration parameters of the database, such as those contained in rules associated with the database. This information is translated into annotations, which can include various configuration parameters of the database. The annotations can be applied to application code, and modifications can be made to the application code (if needed) in order to ensure that the application code is correctly configured to access the database based on the current configuration of the database. In some instances, the annotations can be applied to source code as the source code is being created. In other instances, the annotations can be applied to source code as the source code is being compiled. In still other instances, the annotations can be applied to executable code (such as bytecode), possibly while the executable code is being executed, and this can be repeated on a periodic or other basis to update an executing application during runtime.

In this way, validation can be performed in an application layer based on information from a database layer, and each validation can be performed based on the current configuration of a database in order to provide awareness of any variations or discrepancies. Moreover, this process may occur repeatedly, providing awareness of any variations or discrepancies that are created due to modifications of a database or an application over time. As a result, this reduces or minimizes errors associated with unexpected database configurations that are not supported by an application (or vice versa). In some cases, a validation may occur each time an application attempts to insert or update data in the database, which may help to ensure that the application is updated whenever necessary. Also, the ability to modify executable code based on identified variations or discrepancies can provide for real-time self-healing of an application even during runtime. In cases where certain programming languages (such as Java) are used, this can help to avoid the need to recompile source code in order to account for a changing database configuration, which also helps to avoid application downtime.

FIG. 1 illustrates an example system 100 supporting autonomous self-healing application data validation using database configurations according to this disclosure. As shown in FIG. 1, the system 100 includes multiple user devices 102a-102d, at least one network 104, at least one application server 106, and at least one database server 108 associated with at least one database 110. Note, however, that other combinations and arrangements of components may also be used here.

In this example, each user device 102a-102d is coupled to or communicates over the network 104. Communications between each user device 102a-102d and a network 104 may occur in any suitable manner, such as via a wired or wireless connection. Each user device 102a-102d represents any suitable device or system used by at least one user to provide information to the application server 106 or database server 108 or to receive information from the application server 106 or database server 108. Any suitable number(s) and type(s) of user devices 102a-102d may be used in the system 100. In this particular example, the user device 102a represents a desktop computer, the user device 102b represents a laptop computer, the user device 102c represents a smartphone, and the user device 102d represents a tablet computer. However, any other or additional types of user devices may be used in the system 100. Each user device 102a-102d includes any suitable structure configured to transmit and/or receive information.

The network 104 facilitates communication between various components of the system 100. For example, the network 104 may communicate Internet Protocol (IP) packets, frame relay frames, Asynchronous Transfer Mode (ATM) cells, or other suitable information between network addresses. The network 104 may include one or more local area networks (LANs), metropolitan area networks (MANs), wide area networks (WANs), all or a portion of a global network such as the Internet, or any other communication system or systems at one or more locations. The network 104 may also operate according to any appropriate communication protocol or protocols.

The application server 106 is coupled to the network 104 and is coupled to or otherwise communicates with the database server 108. The application server 106 supports the creation, modification, compilation, storage, and/or execution of one or more applications 112, at least one of which is designed to interact with the database server 108 or the database 110. For example, an application 112 may be configured to retrieve information from the database 110 via the database server 108 for processing and/or provide information to the database 110 via the database server 108 for storage. Of course, the database server 108 may also be used within the application server 106 to store information, in which case the application server 106 may store the information itself.

The application or applications 112 may support any desired functionality in the system 100. Also, the application or applications 112 may have various forms depending on the implementation. In some embodiments, at least one application 112 represents source code being created by one or more users of one or more user devices 102a-102d. In other embodiments, at least one application 112 may represent source code being compiled by the application server

106. In still other embodiments, at least one application 112 may represent executable code being executed by the application server 106, such as on behalf of one or more users of one or more user devices 102a-102d.

The database server 108 operates to store and facilitate retrieval of various information used, generated, or collected by the application server 106 and the user devices 102a-102d in the database 110. For example, the database server 108 may store various information in relational database tables or other data structures in the database 110. In some embodiments, the database 110 is associated with at least one database model 114 supported or used by the database server 108, where the database model 114 collectively represents field definitions, constraints, and other configuration parameters of the database 110. The database model 114 may therefore represent the overall configuration of at least part of the database 110. The field definitions, constraints, and other configuration parameters may be defined using various rules associated with the database 110.

As described above, one or more configuration parameters of a database model 114 may change over time. As particular examples, data fields defined in the database model 114 may initially be unconstrained, but a constraint that limits the size of a data field or that prevents a data field from being empty (having a "null" value) may be defined at a later point in time. Alternatively, the design of an application 112 accessing the database 110 may change over time, such as when an application 112 is originally designed to store data values having shorter lengths and is redesigned later to store data values having longer lengths. In either case, these variations or discrepancies can interfere with proper operation of an application 112. For instance, an application 112 may attempt to write data values in a database 110 that violate a constraint used by the database server 108.

To help alleviate these or other issues, at least one application data validation tool 116 is provided in the system 100 and is used to identify and resolve incongruences between one or more applications 112 and one or more database models 114. As described in more detail below, the application data validation tool 116 is configured to obtain the database model 114 or information associated with the database model 114, such as by obtaining the field definitions and constraints of the database 110. The application data validation tool 116 converts or translates this information into annotations (such as Java Specification Request 303 or "JSR-303" annotations) and applies the annotations to one or more applications 112 in order to update the one or more applications 112 as needed. This modifies the one or more applications 112 to comply with the current configuration of the database 110 as enforced by the database server 108.

Also as described in more detail below, the application data validation tool 116 may be invoked at different times and in different ways to support this functionality, depending on the implementation of the application data validation tool 116. For example, in some embodiments, the application data validation tool 116 may be invoked during creation of source code, such as when the application data validation tool 116 represents a utility (which may be part of a developer's toolkit or an integrated development environment (IDE)). In other embodiments, the application data validation tool 116 may be invoked during compilation of source code, such as when the application data validation tool 116 represents part of a source code compiler, in order to ensure that source code is suitably modified if necessary before being compiled. In still other embodiments, the application data validation tool 116 may be invoked to modify executable code (such as executable bytecode), possibly while the executable code is being executed, and this may be repeated on a periodic or other basis to update an executing application 112. Note that one, some, or all of these approaches may be used in any given environment and that other approaches for using the application data validation tool 116 may also or alternatively be used.

The application data validation tool 116 may be implemented in any suitable manner. For example, in some embodiments, the application data validation tool 116 is implemented using software instructions that are executed by one or more processors of a computing device or other electronic device operating in the system 100. While the application data validation tool 116 is shown here as residing on and being executed by the application server 106, one or more instances of the application data validation tool 116 may be used in any suitable manner and on any suitable device or devices in the system 100. As particular examples, an application data validation tool 116 may be executed by one or more of the user devices 102a-102d, within the network 104 (such as in a cloud computing environment), by the application server 106, or by the database server 108. Additional details regarding the operation of the application data validation tool 116 are provided below.

Although FIG. 1 illustrates one example of a system 100 supporting autonomous self-healing application data validation using database configurations, various changes may be made to FIG. 1. For example, the system 100 may include any number of user devices 102a-102d, networks 104, application servers 106, database servers 108, and databases 110. Also, these components may be located in any suitable locations and might be distributed over a large area. In addition, while FIG. 1 illustrates one example operational environment in which autonomous self-healing application data validation using database configurations may be used, this functionality may be used in any other suitable system.

Figure 2:
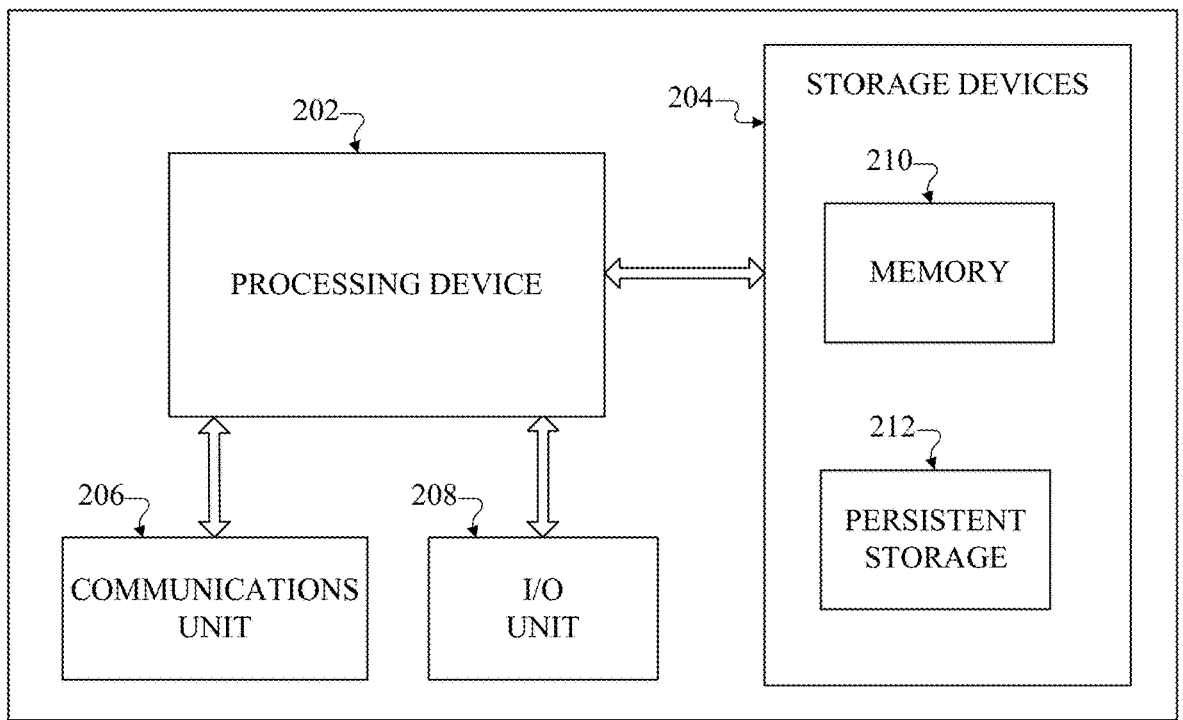
FIG. 2 illustrates an example device supporting autonomous self-healing application data validation using database configurations according to this disclosure.

FIG. 2 illustrates an example device 200 supporting autonomous self-healing application data validation using database configurations according to this disclosure. One or more instances of the device 200 may, for example, be used to at least partially implement the functionality of the application data validation tool 116 of FIG. 1. However, the functionality of the application data validation tool 116 may be implemented in any other suitable manner. In some embodiments, the device 200 shown in FIG. 2 may form at least part of a user device 102a-102d, application server 106, or database server 108 in FIG. 1. However, each of these components may be implemented in any other suitable manner.

As shown in FIG. 2, the device 200 denotes a computing device or system that includes at least one processing device 202, at least one storage device 204, at least one communications unit 206, and at least one input/output (I/O) unit 208. The processing device 202 may execute instructions that can be loaded into a memory 210. The processing device 202 includes any suitable number(s) and type(s) of processors or other processing devices in any suitable arrangement. Example types of processing devices 202 include one or more microprocessors, microcontrollers, digital signal processors (DSPs), application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 can include a network interface card or a wireless transceiver facilitating communications over a wired or wireless network, such as the network 104. The communications unit 206 may support communications through any suitable physical or wireless communication link(s). As a particular example, the communications unit 206 may support communication over the network(s) 104 of FIG. 1.

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device. Note, however, that the I/O unit 208 may be omitted if the device 200 does not require local I/O, such as when the device 200 represents a server or other device that can be accessed remotely.

In some embodiments, the instructions executed by the processing device 202 include instructions that implement the functionality of the application data validation tool 116. Thus, for example, the instructions executed by the processing device 202 may obtain information from or associated with at least one database model 114, generate annotations based on the information, and apply the annotations to one or more applications 112 (in source code, executable code, or other form) to update the application(s) 112 based on the current configuration of the database 110.

Although FIG. 2 illustrates one example of a device 200 supporting autonomous self-healing application data validation using database configurations, various changes may be made to FIG. 2. For example, computing and communication devices and systems come in a wide variety of configurations, and FIG. 2 does not limit this disclosure to any particular computing or communication device or system.

Figure 3:
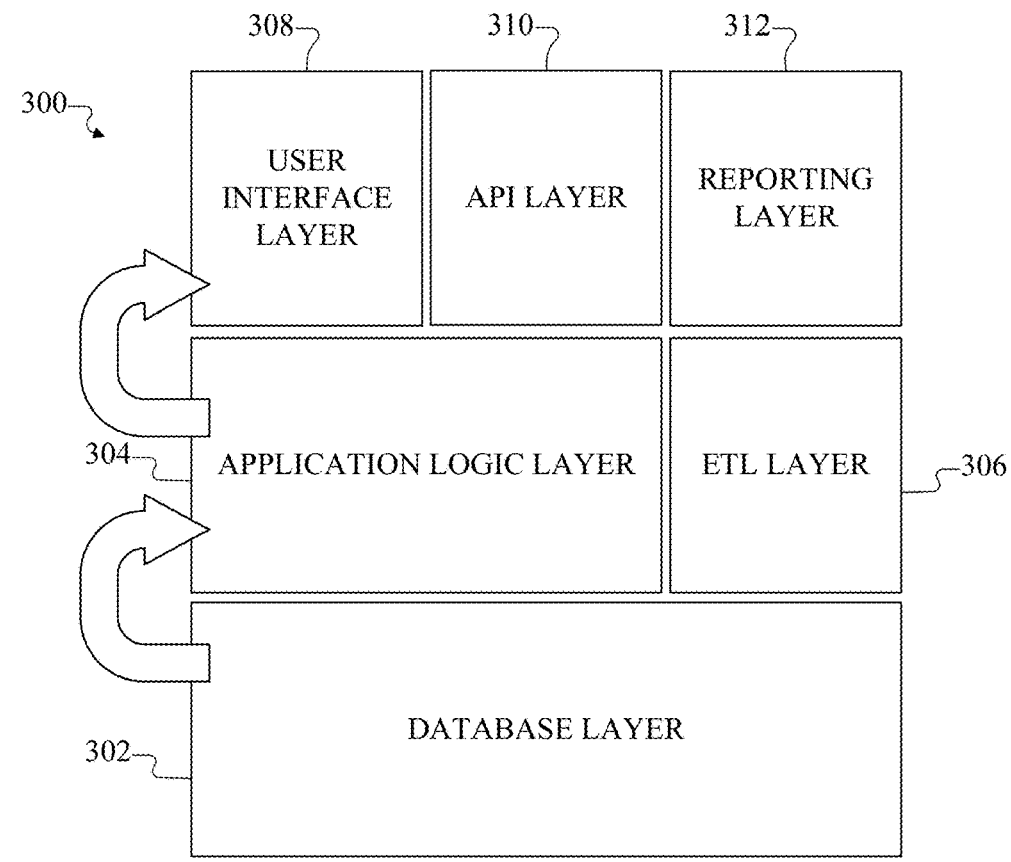
FIG. 3 illustrates an example functional architecture supporting autonomous self-healing application data validation using database configurations according to this disclosure.

FIG. 3 illustrates an example functional architecture 300 supporting autonomous self-healing application data validation using database configurations according to this disclosure. For ease of explanation, the functional architecture 300 shown in FIG. 3 may be described as being implemented or supported using various components in the system 100 of FIG. 1, at least one of which may be implemented using the device 200 of FIG. 2. However, the functional architecture 300 shown in FIG. 3 may be implemented or supported by any suitable device(s) and in any suitable system(s).

As shown in FIG. 3, the functional architecture 300 includes a database layer 302. In general, the database layer 302 of the functional architecture 300 represents the functionality used to store information in and retrieve information from one or more databases in a system. For example, the database layer 302 may represent the functionality of the database server 108 and the database 110 in the system 100. The database layer 302 may also include information defining the one or more databases, such as one or more database models 114.

The functional architecture 300 also includes an application logic layer 304 and an extract, transform, and load (ETL) layer 306. In general, the application logic layer 304 of the functional architecture 300 represents the functionality associated with one or more applications 112 (which can include the application data validation tool 116). For example, the application logic layer 304 may represent the functionality of the application server 106 in the system 100 used with the applications 112. This functionality may include the ability to create, modify, compile, support, or execute one or more applications 112. In general, the ETL layer 306 represents the functionality used to retrieve (extract) data from the database layer 302, reformat or otherwise process (transform) the data, and store (load) the transformed data. As a particular example, the ETL layer 306 may be used to perform backups of the data from the database layer 302 nightly or at other times.

In addition, the functional architecture 300 includes a user interface layer 308, an application programming interface (API) layer 310, and a reporting layer 312. In general, the user interface layer 308 of the functional architecture 300 represents the functionality used to interact with one or more users, and the API layer 310 represents the functionality used to interact with the application logic layer 304. For example, the user interface layer 308 may represent the functionality of the application server 106 and/or the functionality of the user devices 102a-102d used to interact with users. Also, the API layer 310 may represent the functionality of the application server 106 supporting interactions with applications 112 via one or more APIs. In general, the reporting layer 312 of the functional architecture 300 represents the functionality used to interact with the ETL layer 306 in order to support the reporting of information generated or collected by the ETL layer 306, such as for storing information from a database 110 into a backup.

Often times, different individuals or teams manage a database layer 302 and an application logic layer 304 in a particular system. Moreover, the application logic layer 304 itself may represent or include a hierarchical or other multi-tiered arrangement of layers (sometimes referred to as n-tier systems), and different individuals or teams may manage different tiers or layers of the application logic layer 304. Also, often times, consistency between a database 110 of the database layer 302 and one or more applications 112 of the application logic layer 304 may be enforced using manually-created validation rules, which (among other things) are often designed to check for consistency in data sizes, types, and lengths. However, this is a time-consuming process and is subject to inconsistencies over time, particularly when different individuals or teams are creating validation rules for different layers or tiers.

The application data validation tool 116 can be used in the application logic layer 304 as a validation mechanism that sits between the database layer 302 and the user interface layer 308/API layer 310. The application data validation tool 116 obtains information from the database layer 302 regarding one or more databases 110, such as by obtaining field definitions, constraints, or other configuration parameters associated with a database model 114 from a database server 108. The application data validation tool 116 translates that information into annotations (such as JSR-303 annotations) associated with the database configuration parameters. The application data validation tool 116 applies those annotations to one or more applications 112 in the application logic layer 304 and modifies any application 112 having a data object that does not match a corresponding database object in the database 110 as defined by the database model 114. This allows validations of the one or more applications 112 to be enforced using information from the database layer 302 that is injected into the application logic layer 304.

As noted above, the application data validation tool 116 can be used in different ways at different times. For example, during create time, new source code data objects that are to be mapped to database objects may be created. Here, the application data validation tool 116 can map the appropriate annotations associated with the database model 114 to the source code data objects and verify that the source code data objects are properly configured. If not, the application data validation tool 116 can update the source code so that the source code data objects are properly configured to access the database objects in the database 110. Here, among other things, the application data validation tool 116 supports the automatic synchronization of source code with constraints placed on a database 110.

During build (compilation) time, source code that includes source code data objects to be mapped to database objects may be compiled. Here, the application data validation tool 116 can apply the appropriate annotations associated with the database model 114 to the source code data objects and verify that the source code data objects are properly configured. If not, the application data validation tool 116 can update the source code so that the source code data objects are properly configured to access the database objects in the database 110. The application data validation tool 116 can also save the updated source code and initiate compilation of the updated source code. Again, among other things, the application data validation tool 116 supports the automatic synchronization of source code with constraints placed on a database 110.

During execution (run) time, executable code that accesses database objects may be executed. Here, the application data validation tool 116 can re-read the database model 114 and compare the generated annotations to the configuration of the executable code. This may occur continuously, periodically, or at any other suitable times. If discrepancies are identified, the executable code may be dynamically updated to add, modify, or remove objects defined and used by the executable code. This may occur in any suitable manner, such as via dynamic bytecode editing. This supports self-healing of the executable code since the executable code can be updated dynamically. When executable code is modified, it may be performed automatically without user input, or appropriate user authorization (such as from a system administrator via a user device 102a-102d) may be required. Also, if executable code is modified automatically, a notification may be provided to one or more appropriate users (such as a system administrator via a user device 102a-102d) identifying the change. Here, among other things, the application data validation tool 116 supports the automatic synchronization of executable code with constraints placed on a database 110.

Note that one, some, or all of these approaches may be supported by any given application data validation tool 116 or by a collection of application data validation tools 116. That is, in any given system, there may be one or more application data validation tools 116 that support create time validation, one or more application data validation tools 116 that support build time validation, one or more application data validation tools 116 that support runtime validation, or any combination thereof. Also, each instance of the application data validation tool 116 may support create time validation, build time validation, runtime validation, or any combination thereof In all of these approaches, the application data validation tool 116 supports a validation approach that is based on a database model 114 of a database 110 in the database layer 302. As a result, the application data validation tool 116 effectively supports a "write once, reflect everywhere" validation approach in which field definitions, constraints, or other database parameters of the database model 114 are stored by the database server 108 in the database layer 302 once and used in other layers (including all tiers of the application logic layer 304) for validation. In this way, the database model 114 in the database layer 302 acts as a source of information that can flow up through the layers of a multi-layered application architecture or other application logic layer 304.

This type of functionality can have wide-ranging applicability in a number of fields. For example, this type of functionality may be used to improve application resiliency in any industry using information systems driven by relational databases. As particular examples, this type of functionality may be used to assist with application uptime for critical availability systems and to improve reliability and adaptability of information systems. This type of functionality can be used with open-source platforms or proprietary platforms, and it may be offered as an enhanced plug-in or add-on capability or as a feature of a premium product for software development teams or other personnel. In addition, this type of functionality is widely applicable to software development teams or other personnel in numerous industries both domestically and worldwide, regardless of team size, language, or business.

Although FIG. 3 illustrates one example of a functional architecture 300 supporting autonomous self-healing application data validation using database configurations, various changes may be made to FIG. 3. For example, components can be added, omitted, combined, further subdivided, replicated, or placed in any other suitable configuration in the functional architecture 300 according to particular needs. Also, the functionality for autonomous self-healing application data validation using database configurations may be used in any other suitable functional architecture.

Figure 4:
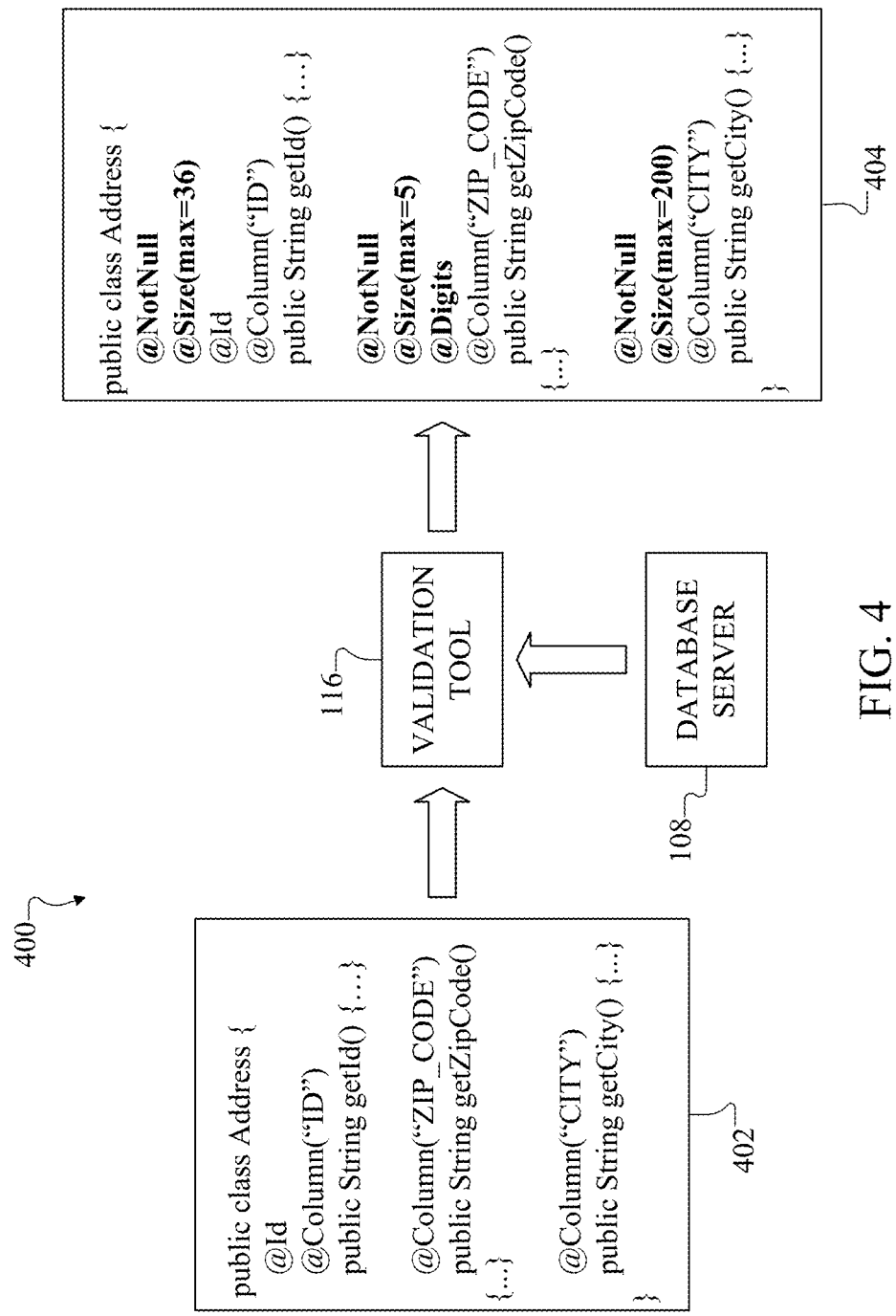
FIG. 4 illustrates an example application of autonomous self-healing application data validation that is performed using database configurations according to this disclosure.

FIG. 4 illustrates an example application 400 of autonomous self-healing application data validation that is performed using database configurations according to this disclosure. For ease of explanation, the application 400 shown in FIG. 4 may be described as being performed using the application data validation tool 116 in the system 100 of FIG. 1, which may be implemented using the device 200 of FIG. 2. However, the application data validation tool 116 may be used in any other suitable manner by any other suitable device(s) and in any other suitable system(s).

As shown in FIG. 4, the application data validation tool 116 receives input source code that includes a source code data object 402. The source code data object 402 here defines a data structure associated with a database 110 to be accessed or used by the input source code. In this particular example, the source code data object 402 is defining an "address" data structure that includes an "identifier" data field, a "zip code" data field, and a "city" data field. The application data validation tool 116 also receives information associated with a database model 114 from a database server 108, such as rules or other information identifying field definitions, constraints, or other configuration parameters of a database 110.

The application data validation tool 116 generates annotations (such as JSR-303 annotations) based on the information from the database server 108 and applies the annotations to the input source code. The application data validation tool 116 also modifies the input source code, if needed, based on the annotations to produce output source code that includes a source code data object 404. The output source code may represent a modified version of the input source code, assuming the application data validation tool 116 identifies one or more discrepancies between the input source code and the database model 114. Otherwise, the output source code may represent the input source code if no discrepancies between the input source code and the database model 114 are identified.

In this particular example, the source code data object 404 has been modified to include database constraints placed on one or more of the data fields being defined in the source code data object 402. For convenience, the constraints are identified using bolded text in FIG. 4. Here, the "identifier" data field is now constrained to have a maximum size of thirty-six characters and cannot be empty. Also, the "zip code" data field is now constrained to have a maximum size of five numerical digits and cannot be empty. In addition, the "city" data field is now constrained to have a maximum size of two hundred characters and cannot be empty. By modifying the source code data object 402 to produce the source code data object 404, the resulting output source code complies with the current configuration of a database 110 to be accessed and used by the output source code. As a result, the output source code may have fewer or no errors during execution, at least with respect to the current configuration of the database 110.

Note that the application 400 shown in FIG. 4 may occur during create time of the source code or during build time when the source code is compiled. However, the same or similar operations may occur at other times. For instance, the input to the application data validation tool 116 may represent the known data object definitions of executable code, and the application data validation tool 116 may identify any changes to be made to the executable code based on the current configuration of the database 110. The application data validation tool 116 or another tool may also edit bytecode or otherwise modify the executable code in order to implement the identified changes and update the executable code with the current configuration of the database 110.

Although FIG. 4 illustrates one example of an application 400 of autonomous self-healing application data validation that is performed using database configurations, various changes may be made to FIG. 4. For example, the application 400 shown in FIG. 4 is merely meant to illustrate one way in which the application data validation tool 116 may operate. The application data validation tool 116 may operate using any other suitable inputs and produce any other suitable outputs depending on the implementation and use of the application data validation tool 116.

Figure 5:
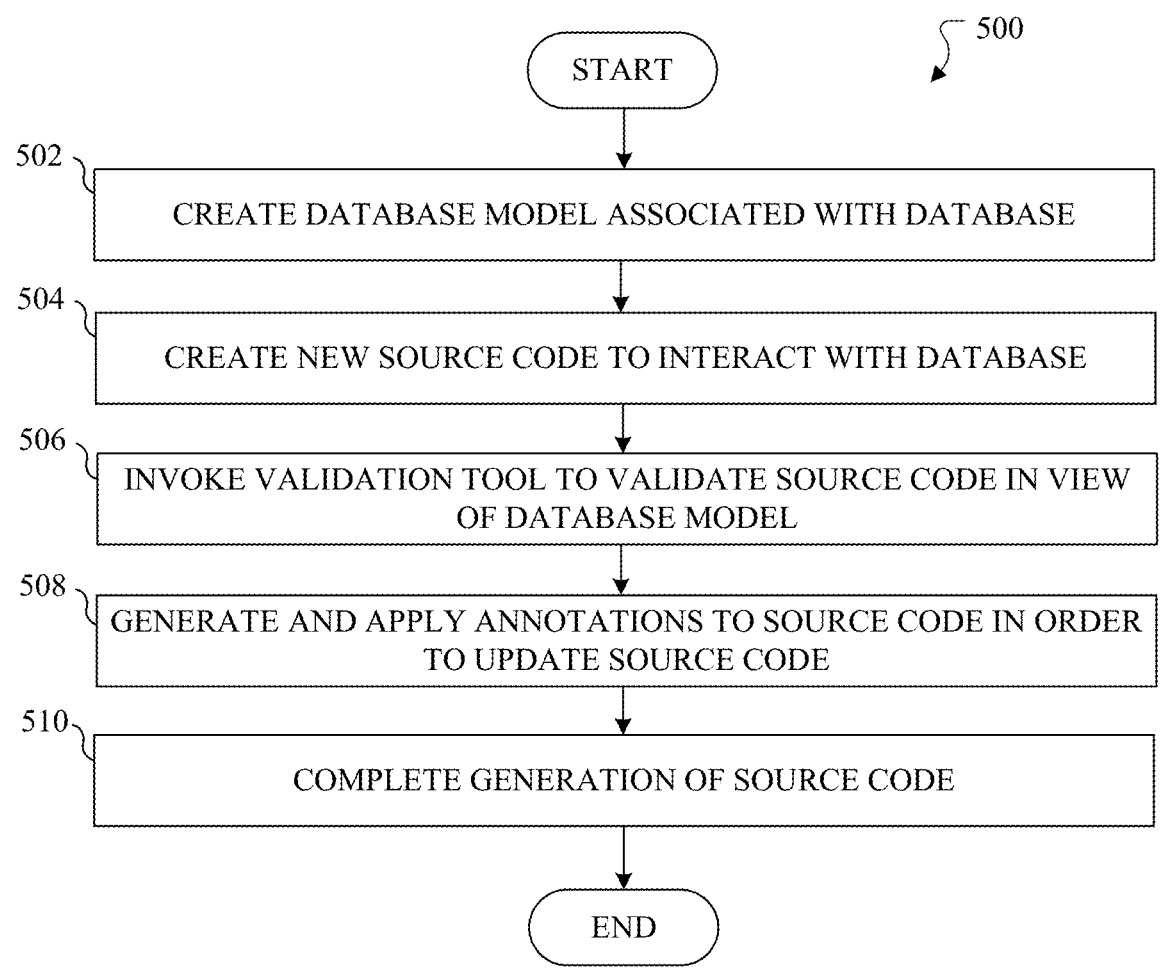
FIG. 5 illustrates an example method for performing self-healing application data validation using database configurations during source code generation according to this disclosure.

FIG. 5 illustrates an example method 500 for performing self-healing application data validation using database configurations during source code generation according to this disclosure. For ease of explanation, the method 500 shown in FIG. 5 may be described as being implemented or supported using various components in the system 100 of FIG. 1, at least one of which may be implemented using the device 200 of FIG. 2. However, the method 500 shown in FIG. 5 may be implemented or supported by any suitable device(s) and in any suitable system(s).

As shown in FIG. 5, a database model associated with a database is created at step 502. This may include, for example, personnel defining a database model 114 containing rules or other information that identifies field definitions, constraints, and other configuration parameters of a database 110. As a particular example, this may include personnel using a relational database management system to define a database model 114 for a relational database. New source code designed to interact with the database is created at step 504. This may include, for example, personnel writing source code containing source code data objects that are designed to use data from or provide data to the database 110. As a particular example, this may include personnel writing Java code or other programming code that defines source code data objects to interact with the database 110. Note that the personnel who create the database model 114 and the personnel who create the source code may often represent different individuals or teams of personnel.

A validation tool is invoked to validate the source code in view of the current database model at step 506. This may include, for example, personnel invoking the application data validation tool 116 to analyze the source code and the database model 114 in order to find discrepancies. In some cases, the application data validation tool 116 may be implemented as a utility, which may be part of a developer's toolkit or an IDE. As part of this process, the validation tool generates annotations associated with the database model (such as annotations based on the field definitions, constraints, or other configuration parameters) and applies the annotations to the source code at step 508. This may include, for example, the application data validation tool 116 generating annotations identifying constraints placed on different data fields in the database 110 or identifying other configuration parameters of the database 110. This may also include the application data validation tool 116 inserting any missing constraints or other configuration parameters from the annotations into the source code or otherwise modifying the source code to conform to the current database configuration in order to produce updated source code.

The generation of the source code is completed at step 510. This may include, for example, personnel reviewing and accepting or rejecting the changes made to the source code by the application data validation tool 116. This may also include the personnel creating any additional source code needed to complete the base code for an application 112 or other software.

Although FIG. 5 illustrates one example of a method 500 for performing self-healing application data validation using database configurations during source code generation, various changes may be made to FIG. 5. For example, while shown as a series of steps, various steps in FIG. 5 may overlap, occur in parallel, occur in a different order, or occur any number of times. As a particular example, various ones of steps 502-508 may occur repeatedly and in any desired order prior to the source code being completed.

Figure 6:
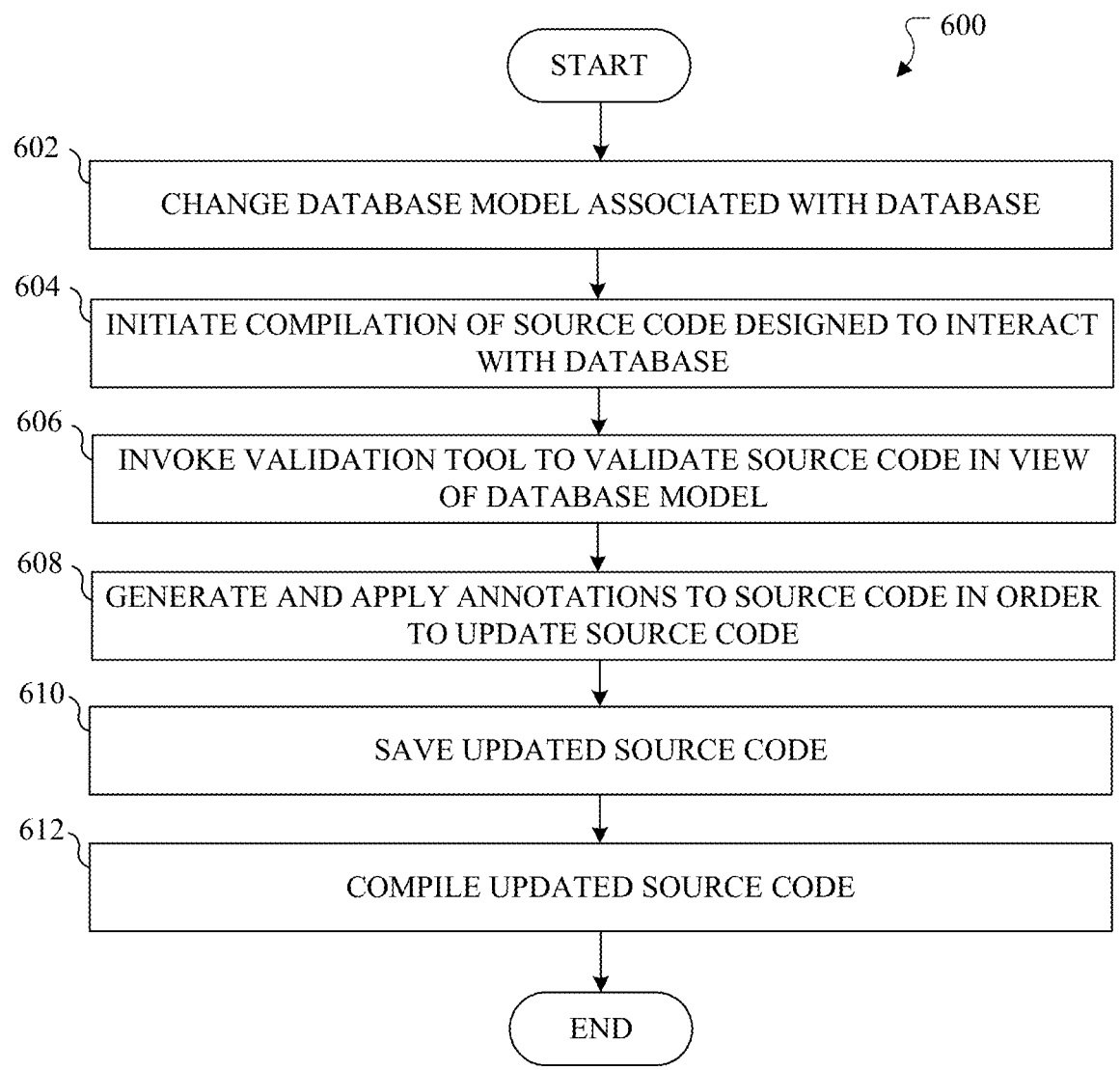
FIG. 6 illustrates an example method for performing self-healing application data validation using database configurations during source code compilation according to this disclosure.

FIG. 6 illustrates an example method 600 for performing self-healing application data validation using database configurations during source code compilation according to this disclosure. For ease of explanation, the method 600 shown in FIG. 6 may be described as being implemented or supported using various components in the system 100 of FIG. 1, at least one of which may be implemented using the device 200 of FIG. 2. However, the method 600 shown in FIG. 6 may be implemented or supported by any suitable device(s) and in any suitable system(s).

As shown in FIG. 6, a database model associated with a database is changed at step 602. This may include, for example, personnel updating a database model 114 to contain one or more modified rules or other information that identifies one or more modified field definitions, constraints, or other configuration parameters of a database 110. It is assumed here that the database model 114 has already been created, such as during step 502 in FIG. 5. However, in other embodiments, the database model 114 may actually be created as part of step 602. Compilation of source code designed to interact with the database is initiated at step 604. This may include, for example, personnel initiating a build process to compile source code containing source code data objects that are designed to use data from or provide data to the database 110. Again, note that the personnel who change the database model 114 and the personnel who initiate compilation of the source code may often represent different individuals or teams of personnel.

A validation tool is invoked to validate the source code to be compiled in view of the current database model at step 606. This may include, for example, a compiler invoking the application data validation tool 116 to analyze the source code and the database model 114 in order to find discrepancies. As part of this process, the validation tool generates annotations associated with the database model (such as annotations based on the field definitions, constraints, or other configuration parameters) and applies the annotations to the source code at step 608. This may include, for example, the application data validation tool 116 generating annotations identifying constraints placed on different data fields in the database 110 or identifying other configuration parameters of the database 110. This may also include the application data validation tool 116 inserting any missing constraints or other configuration parameters from the annotations into the source code or otherwise modifying the source code to conform to the current database configuration in order to produce updated source code.

The updated source code is saved at step 610 and compiled at step 612. This may include, for example, the application data validation tool 116 saving the updated source code as a new version of the source code in a code management system or other system. This may also include the compiler compiling the updated source code to produce executable code. Note that the application data validation tool 116 may or may not give personnel an opportunity to review and accept or reject the changes made to the source code by the application data validation tool 116 as part of the compilation process.

Although FIG. 6 illustrates one example of a method 600 for performing self-healing application data validation using database configurations during source code compilation, various changes may be made to FIG. 6. For example, while shown as a series of steps, various steps in FIG. 6 may overlap, occur in parallel, occur in a different order, or occur any number of times.

Figure 7:
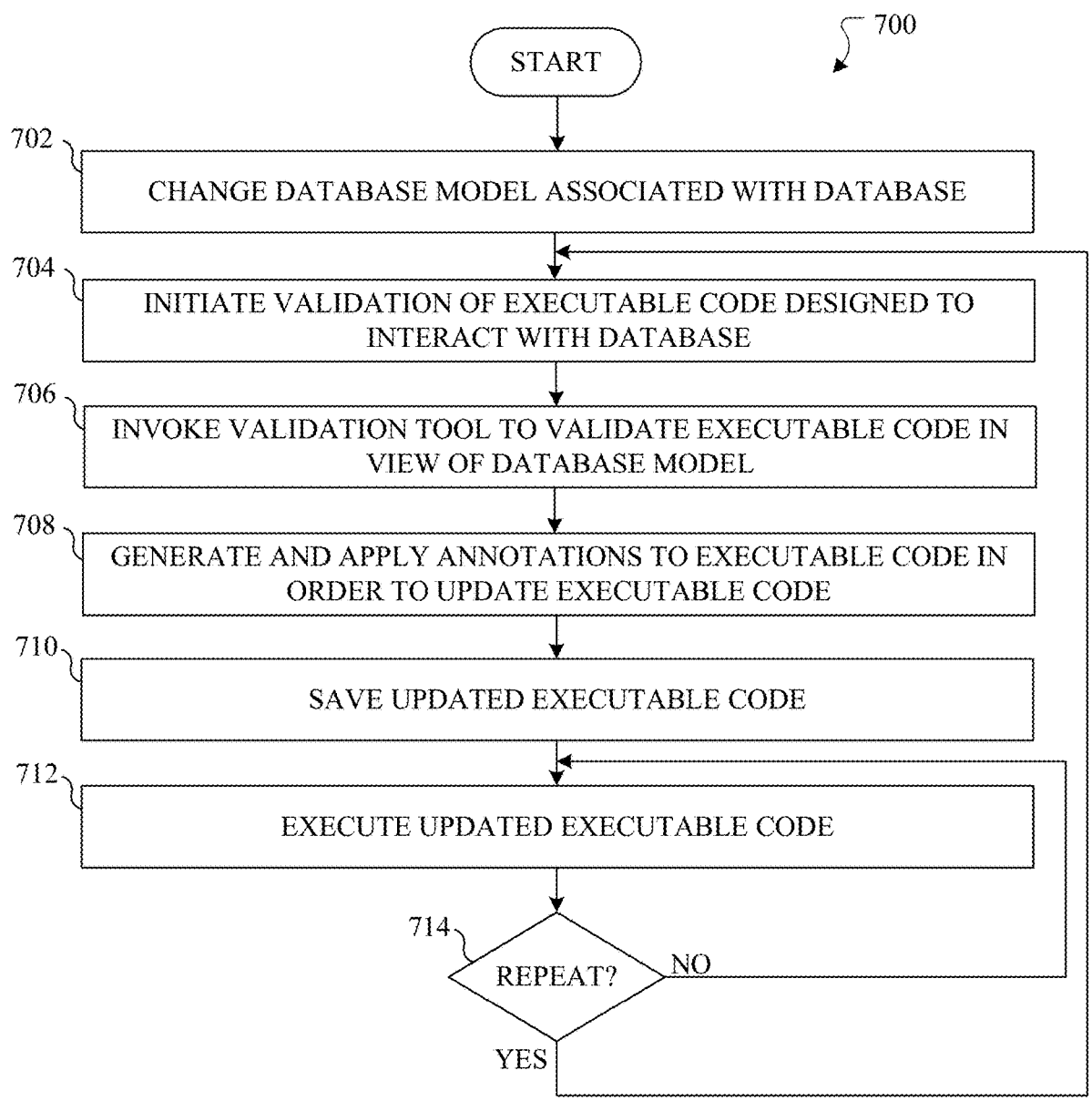
FIG. 7 illustrates an example method for performing self-healing application data validation using database configurations during code execution according to this disclosure.

FIG. 7 illustrates an example method 700 for performing self-healing application data validation using database configurations during code execution according to this disclosure. For ease of explanation, the method 700 shown in FIG. 7 may be described as being implemented or supported using various components in the system 100 of FIG. 1, at least one of which may be implemented using the device 200 of FIG. 2. However, the method 700 shown in FIG. 7 may be implemented or supported by any suitable device(s) and in any suitable system(s).

As shown in FIG. 7, a database model associated with a database is changed at step 702. This may include, for example, personnel updating a database model 114 to contain one or more modified rules or other information that identifies one or more modified field definitions, constraints, or other configuration parameters of a database 110. It is assumed here that the database model 114 has already been created and is being used by executable code of an executing application 112. Validation of the executable code that interacts with the database is initiated at step 704. This may include, for example, the application server 106 determining that a specified amount of time has elapsed, the executable code is attempting to access the database 110, or some other triggering event has occurred.

A validation tool is invoked to validate the executable code in view of the current database model at step 706. This may include, for example, the application data validation tool 116 being invoked to analyze the data objects used by the executable code and the database model 114 in order to find discrepancies. As part of this process, the validation tool generates annotations associated with the database model (such as annotations based on the field definitions, constraints, or other configuration parameters) and applies the annotations to the data objects used by the executable code at step 708. This may include, for example, the application data validation tool 116 generating annotations identifying constraints placed on different data fields in the database 110 or identifying other configuration parameters of the database 110. This may also include the application data validation tool 116 identifying any missing constraints or other configuration parameters from the annotations in the data objects used by the executable code or otherwise identifying discrepancies between the data objects used by the executable code and the current database configuration. This may further include the application data validation tool 116 editing bytecode or other executable code in order to resolve the identified discrepancies between the data objects used by the executable code and the current database configuration.

The updated executable code is saved at step 710 and executed at step 712. This may include, for example, the application data validation tool 116 saving the updated source code in the application server 106. This may also include the application server 106 executing the updated executable code on behalf of one or more users of one or more user devices 102a-102d. Note that the application data validation tool 116 may or may not give personnel an opportunity to review and accept or reject the changes made to the executable code by the application data validation tool 116 as part of the editing process. However, the application data validation tool 116 may notify one or more users (such as one or more system administrators) of the changes made to the executable code.

A decision is made whether to repeat the validation (and possibly the editing) of the executable code at step 714. This may include, for example, the application server 106 determining whether the specified amount of time has elapsed again, the executable code is attempting to access the database 110 again, or some other triggering event has occurred. If not, execution of the updated executable code may continue at step 712. Otherwise, the process returns to step 704 to initiate another validation, except in this iteration the database model 114 is used to validate the updated executable code. In this way, the executable code can be updated over time to account for various discrepancies between the executable code and the database model 114 that may arise over time.

Although FIG. 7 illustrates one example of a method 700 for performing self-healing application data validation using database configurations during code execution, various changes may be made to FIG. 7. For example, while shown as a series of steps, various steps in FIG. 7 may overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    obtaining information associated with a database model, the information including configuration parameters of a database defined by the database model;
    obtaining information defining data objects associated with an application, the data objects to be used by the application to access the database;
    identifying one or more discrepancies between at least one of the data objects and the configuration parameters of the database by comparing annotations associated with the configuration parameters of the database to the data objects; and
    modifying the at least one data object by inserting at least part of one or more of the annotations into the at least one data object in order to conform the application to a current configuration of the database.

2. The method of claim 1, wherein:
    the application comprises source code;
    the data objects associated with the application comprise source code data objects;
    identifying the one or more discrepancies comprises identifying the one or more discrepancies during creation or compilation of the source code; and
    modifying the at least one data object comprises modifying at least one of the source code data objects.

3. The method of claim 1, wherein:
    the application comprises executable code;
    identifying the one or more discrepancies comprises identifying the one or more discrepancies during execution of the executable code; and
    modifying the at least one data object comprises modifying a portion of the executable code during the execution of the executable code.

4. The method of claim 3, further comprising:
    repeatedly obtaining the information associated with the database model, obtaining the information defining the data objects, and identifying any discrepancies between the data objects and the configuration parameters over time.

5. The method of claim 1, wherein:
    the configuration parameters of the database comprise (i) field definitions defining data fields and (ii) constraints placed on values in the data fields; and
    modifying the at least one data object comprises modifying the at least one data object to include at least one of: one or more of the field definitions and one or more of the constraints.

6. The method of claim 5, wherein:
    the application comprises a multi-tier application; and
    the field definitions and the constraints are used to validate data objects in all tiers of the multi-tier application.

7. An apparatus comprising:
    at least one memory configured to store:
        information associated with a database model, the information including configuration parameters of a database defined by the database model; and
        information defining data objects associated with an application, the data objects to be used by the application to access the database; and
    at least one processor configured to:
        compare annotations associated with the configuration parameters of the database to the data objects in order to identify one or more discrepancies between at least one of the data objects and the configuration parameters of the database; and
        insert at least part of one or more of the annotations into the at least one data object so as to modify the at least one data object to conform the application to a current configuration of the database.

8. The apparatus of claim 7, wherein:
    the application comprises source code;
    the data objects associated with the application comprise source code data objects;

the at least one processor is configured to identify the one or more discrepancies during creation or compilation of the source code; and the at least one processor is configured to modify at least one of the source code data objects.

9. The apparatus of claim 7, wherein:

the application comprises executable code;

the at least one processor is configured to identify the one or more discrepancies during execution of the executable code; and the at least one processor is configured to modify a portion of the executable code during the execution of the executable code.

10. The apparatus of claim 9, wherein the at least one processor is further configured to repeatedly obtain the information associated with the database model, obtain the information defining the data objects, and identify any discrepancies between the data objects and the configuration parameters over time.

11. The apparatus of claim 7, wherein:

the configuration parameters of the database comprise (i) field definitions defining data fields and (ii) constraints placed on values in the data fields; and the at least one processor is configured to modify the at least one data object to include at least one of: one or more of the field definitions and one or more of the constraints.

12. The apparatus of claim 11, wherein:

the application comprises a multi-tier application; and the at least one processor is configured to use the field definitions and the constraints to validate data objects in all tiers of the multi-tier application.

13. A non-transitory computer readable medium containing instructions that when executed cause at least one processor to:

obtain information associated with a database model, the information including configuration parameters of a database defined by the database model;

obtain information defining data objects associated with an application, the data objects to be used by the application to access the database;

compare annotations associated with the configuration parameters of the database to the data objects in order to identify one or more discrepancies between at least one of the data objects and the configuration parameters of the database; and insert at least part of one or more of the annotations into the at least one data object so as to modify the at least one data object to conform the application to a current configuration of the database.

14. The non-transitory computer readable medium of claim 13, wherein:

the application comprises source code;

the data objects associated with the application comprise source code data objects;

the instructions when executed cause the at least one processor to identify the one or more discrepancies during creation or compilation of the source code; and the instructions when executed cause the at least one processor to modify at least one of the source code data objects.

15. The non-transitory computer readable medium of claim 13, wherein:

the application comprises executable code;

the instructions when executed cause the at least one processor to identify the one or more discrepancies during execution of the executable code; and the instructions when executed cause the at least one processor to modify a portion of the executable code during the execution of the executable code.

16. The non-transitory computer readable medium of claim 15, further containing instructions that when executed cause the at least one processor to obtain the information associated with the database model, obtain the information defining the data objects, and identify any discrepancies between the data objects and the configuration parameters over time.

17. The non-transitory computer readable medium of claim 13, wherein:

the configuration parameters of the database comprise (i) field definitions defining data fields and (ii) constraints placed on values in the data fields; and the instructions when executed cause the at least one processor to modify the at least one data object to include at least one of: one or more of the field definitions and one or more of the constraints.

18. The non-transitory computer readable medium of claim 17, wherein:

the application comprises a multi-tier application; and the instructions when executed cause the at least one processor to use the field definitions and the constraints to validate data objects in all tiers of the multi-tier application.

19. The method of claim 1, wherein the annotations comprise Java Specification Request 303 (JSR-303) annotations.

20. The apparatus of claim 7, wherein the annotations comprise Java Specification Request 303 (JSR-303) annotations.

21. The non-transitory computer readable medium of claim 13, wherein the annotations comprise Java Specification Request 303 (JSR-303) annotations.

* * * * *